US009870433B2

(12) United States Patent
Dong et al.

(10) Patent No.: US 9,870,433 B2
(45) Date of Patent: Jan. 16, 2018

(54) DATA PROCESSING METHOD AND SYSTEM OF ESTABLISHING INPUT RECOMMENDATION

(71) Applicant: Alibaba Group Holding Limited, Grand Cayman (KY)

(72) Inventors: Fan Dong, Hangzhou (CN); Yinan Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 380 days.

(21) Appl. No.: 14/639,875

(22) Filed: Mar. 5, 2015

(65) Prior Publication Data

US 2015/0254263 A1 Sep. 10, 2015

(30) Foreign Application Priority Data

Mar. 6, 2014 (CN) .......................... 2014 1 0080568

(51) Int. Cl.
*G06F 17/00* (2006.01)
*G06F 17/30* (2006.01)

(52) U.S. Cl.
CPC .... *G06F 17/3097* (2013.01); *G06F 17/30312* (2013.01); *G06F 17/30424* (2013.01); *G06F 17/30554* (2013.01)

(58) Field of Classification Search
CPC ........... G06F 17/30864; G06F 17/3064; G06F 17/3097; G06F 17/30867; G06F 17/3053
See application file for complete search history.

(56) References Cited

U.S. PATENT DOCUMENTS

| | | | |
|---|---|---|---|
| 6,564,213 B1 | 5/2003 | Ortega et al. | |
| 8,515,954 B2 | 8/2013 | Gibbs et al. | |
| 2006/0253427 A1 | 11/2006 | Wu et al. | |
| 2007/0083483 A1 | 4/2007 | Lawande | |
| 2007/0100890 A1 | 5/2007 | Kim | |
| 2007/0208733 A1 | 9/2007 | Brault | |
| 2010/0169341 A1 | 7/2010 | Hu et al. | |
| 2012/0158782 A1 | 6/2012 | Transier et al. | |
| 2012/0221543 A1 | 8/2012 | Timm et al. | |
| 2013/0080460 A1 | 3/2013 | Tomko et al. | |
| 2013/0132381 A1* | 5/2013 | Chakrabarti ...... | G06F 17/30864 707/730 |
| 2014/0028603 A1 | 1/2014 | Xie et al. | |
| 2014/0201229 A1 | 7/2014 | Kirazci | |
| 2014/0280092 A1 | 9/2014 | Marantz et al. | |

OTHER PUBLICATIONS

The PCT Search Report and Written Opinion dated Jun. 17, 2015 for PCT application No. PCT/US2015/019010, 11 pages.

* cited by examiner

*Primary Examiner* — Truong Vo
(74) *Attorney, Agent, or Firm* — Lee & Hayes, PLLC

(57) ABSTRACT

A data processing method of establishing an input recommendation is provided. The method establishes an inverted index having a variable prefix length based on entry number distribution, thus preventing the established inverted index from generating a number of index entries that are rarely used, and reducing the redundancy of the input recommendation index that is created.

20 Claims, 11 Drawing Sheets

DATA PROCESSING METHOD AND SYSTEM OF ESTABLISHING INPUT RECOMMENDATION

CROSS REFERENCE TO RELATED PATENT APPLICATION

This application claims foreign priority to Chinese Patent Application No. 201410080568.9 filed on Mar. 6, 2014, entitled "Data Processing Method and System of Establishing Input Recommendation", which is hereby incorporated by reference in its entirety.

TECHNICAL FIELD

The application relates to the field of searching, and more particularly, to data processing methods and systems of establishing input recommendation.

BACKGROUND

A search engine is a system for collecting and organizing information resources in the Internet and providing users with a searching capability. The system includes information collection, information organization and user query. Typically, a user inputs a keyword in the search engine to conduct a search, and the search engine finds content that matches with the keyword from an index database to feedback to the user.

Recently, a number of search engines provide a series of suggested search queries that are related to an original search query of a user. This series of suggested search queries is also referred to as an input recommendation, which corresponds to complete input strings that are recommended based on a partial input that is currently provided in an input box. For example, a search engine may include a query input area for receiving a textual input. A search service provides search query suggestions for the textual input, and a user may select a search query suggestion as a search query term. Input recommendations are mainly used for recommending a complete text that is potentially inputted by a user according to an existing partial input and facilitating the user to complete the textual input quickly during a process of user input. For example, if an original search term that is inputted by a user is "中", the search engine may offer relevant search terms such as "中国 (China)", "中心 (center)", "中医 (Chinese medicine)", etc.

Currently, a method for providing an input recommendation mainly includes: generating an offline index for input recommendations and providing an online input recommendation. The procedure of generating the offline index for the input recommendations may also be referred to as creating the input recommendations, which may include: listing all prefixes for all recommended entries; combining different entries having the same prefix; generating an inverted index for recommended entries which prefixes are combined; sorting the inverted index of each prefix according to specific business needs; truncating the most important first N entries as input recommendations for a respective prefix; and generating a prefix index. The procedure of providing the online input recommendation may include: searching the prefix index according to a current input of a user in a text box and returning an index record based on the prefix index, the index record being an input recommendation that is provided.

However, at least the following problems are found in existing technologies of establishing an input recommendation:

Since the number of recommended entries is relatively large and the number of complete lists of prefixes for each recommended entries is also large, the number of all prefixes that are listed for all recommended entries is enormous. Within an inverted index that is created based on this enormous number of prefixes, a large number of index entries are hardly used, for example, some index entries with a relatively long prefix length. If a relatively short prefix points to a few entries, the created index may absolutely include entries that are pointed by longer prefixes. As such, index entries corresponding to the longer prefixes may rarely be used. As can be seen from the above explanation, redundancy exists in an input recommendation index created according to the existing methods.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a data processing method and system of establishing an input recommendation so as to reduce a degree of redundancy for an input recommendation index that is created.

According to an embodiment, a data processing method of establishing an input recommendation, which includes:

generating a prefix which length is less than or equal to a first length for each entry, taking the prefix as a current prefix, and taking the first length as a current length;

combining prefixes having a same content in all current prefixes and generating an inverted index for the combined prefixes and corresponding entries;

determining whether a respective number of entries pointed by each prefix in the inverted index is greater than a preset value N;

if a prefix that points to more than N number of entries exists in the inverted index, truncating entries for the prefix which number of entries is greater than N in the inverted index, updating the current prefix and the current length based on a prefix which prefix length is equal to the current length and which number of entries is (N+1) in the inverted index, and returning the current prefix and the current length that have been updated to the combining of the prefixes for reprocessing; and outputting the inverted index as an input recommendation index if the respective number of entries pointed by each prefix is less than or equal to N.

In an embodiment, truncating the entries for the prefix which number of entries is greater than N in the inverted index includes: for the prefix which number of entries is greater than N in the inverted index, truncating first N entries that are pointed by the prefix if a length of the prefix is less than the current length, and truncating first (N+1) entries that are pointed by the prefix if the length of the prefix is equal to the current length.

In an embodiment, updating the current prefix and the current length based on the prefix which prefix length is equal to the current length and which number of entries is (N+1) in the inverted index includes: adding one byte to the prefix which prefix length is equal to the current length and which number of entries is (N+1) according to entry content to form a new prefix, taking all prefixes with the new prefix as updated current prefixes, and taking the current length that is increased by one as an updated current length.

In an embodiment, a minimum value of the first length is three.

In an embodiment, a minimum value of N is five.

In an embodiment, prior to generating the prefix which length is less than or equal to the first length for each entry, the method further includes: preprocessing the entries, preprocessing the entries comprising at least one of:

eliminating a meaningless character from the entries, the meaningless character comprising a space and/or a punctuation; and unifying uppercase and lowercase letters, and simplified and traditional Chinese characters in entry content.

According to another embodiment, a data processing system of establishing an input recommendation includes: a prefix generation unit, an inverted index generation unit, a first determination unit, a determination truncation unit and an updating unit, wherein:

the prefix generation unit is configured to generate a prefix which length is less than or equal to a first length for each entry, and take the prefix as a current prefix and the first length as a current length;

the inverted index generation unit is configured to combine prefixes having a same content in current prefixes and generate an inverted index for the combined prefixes and corresponding entries;

the first determination unit is configured to determine whether a number of entries that are pointed by each prefix in the generated inverted index is greater than N, shift to the determination truncation unit for processing if the number of entries is greater than N, and output the inverted index as an input recommendation index that is created if the number of entries that are pointed by each prefix is less than or equal to N;

the determination truncation unit is configured to truncate entries for a prefix which number of entries is greater than N in the inverted index; and the updating unit is configured to update the current prefix and the current length based on a prefix which prefix length is equal to the current length and which number of entries is (N+1) in the inverted index, and return the current prefix and the current length that are updated to the inverted index generation unit for reprocessing.

In an embodiment, the determination truncation unit comprises a length determination unit and a truncation unit, wherein:

the length determination unit is configured to determine whether a length of each prefix in the current prefixes is less than the current length; and the truncation unit is configured to truncate first N entries from entries that are pointed by a prefix which prefix length is less than the current length based on a result of the length determination unit, and truncate first (N+1) entries from entries that are pointed by a prefix which prefix length is equal to the current length based on the result of the length determination unit.

In an embodiment, the updating unit comprises a prefix updating unit and a current length updating unit, wherein:

the prefix updating unit is configured to add one byte to the prefix which prefix length is equal to the current length according to entry content based on the result of the length determination unit to form a new prefix, and update all prefixes with the new prefix as the current prefixes; and the current length updating unit is configured to increase the current length by one as an updated current length.

In an embodiment, the inverted index generation unit comprises a combination unit and an indexing unit, wherein:

the combination unit is configured to combine the prefixes having the same content in all current prefixes; and the indexing unit is configured to generate the inverted index for the combined prefixes and the entries corresponding to the prefixes.

In an embodiment, the first determination unit comprises a number determination unit and an output unit, wherein:

the number determination unit is configured to determine whether the number of entries that are pointed by each prefix in the current prefixes is greater than N in the inverted index that is generated by the inverted index generation unit; and the output unit is configured to output the inverted index, and output an inverted index result of the inverted index generation unit if the number of entries that are pointed by each prefix is less than or equal to N based on a determination result of the number determination unit.

In an embodiment, the data processing system of establishing the input recommendation further comprises an entry preprocessing unit, the entry preprocessing unit being configured to preprocess each entry.

According to yet another embodiment, a method of providing an input recommendation based on an index that is created by the data processing method of establishing the input recommendation, which includes:

setting up a second length, determining whether a length of a received query string is greater than the second length, and taking an inverted index corresponding to a query string which length is less than or equal to the second length as an input recommendation result;

truncating a query string which length is greater than the second length based on the second length;

determining whether a number of entries in an inverted index corresponding to the truncated query string is greater than N, updating the second length if the number of entries is greater than N, and returning the updated second length for repeating the truncating until the number of entries corresponding to the truncated query string is less than or equal to N;

filtering unmatched entries if the length of the query string is greater than the second length and the number of entries corresponding to the query string truncated is less than or equal to N; and outputting the input recommendation result of the query string.

In an embodiment, updating the second length includes taking the second length that is increased by one as the updated second length.

In an embodiment, filtering the unmatched entries includes: comparing all entries corresponding to the truncated query string with the query string one character by one character starting from a first character, and filtering out an entry which first x characters are not identical to the query string, x representing the length of the query string.

In an embodiment, comparing all entries in the inverted index that are found based on the truncated query string with the query string one character by one character comprises: converting the query string and the entries into phonetic alphabets for comparison when characters of the query string and the entries are not in a same language during a comparison process.

In an embodiment, outputting the input recommendation result of the query string includes: directly outputting corresponding entries as the input recommendation result of the query string for the query string which length is less than the second length; returning a null value as the input recommendation result of the query string when no same index is found after the truncating; and taking a result after filtering the unmatched entries as the input recommendation result of the query string for the index that is found after the truncating.

In an embodiment, setting up the second length comprises: setting up a value of the second length to be equal to a value of the first length.

According to another embodiment, a system of providing input recommendation based on an index created by the data processing system of establishing input recommendation, comprises: a length query unit, a query string truncation unit, a determination updating unit, a filtering unit and a recommendation output unit, wherein:

the length query unit is configured to set up a second length, determine whether a length of a query string received is greater than the second length, and take an inverted index corresponding to a query string which length is less than or equal to the second length as an input recommendation result;

the query string truncation unit is configured to truncate a query string which length is greater than the second length based on the second length;

the determination updating unit is configured to determine whether a number of entries in an inverted index corresponding to the truncated query string is greater than N, updating the second length if the number of entries is greater than N, and returning to the query string truncation unit for repeating the truncating until the number of entries corresponding to the truncated query string is less than or equal to N;

the filtering unit is configured to filter unmatched entries if the length of the query string is greater than the second length and the number of entries corresponding to the query string truncated is less than or equal to N; and the recommendation output unit is configured to output the input recommendation result of the query string.

In an embodiment, the determination updating unit comprises an entry number determination unit, a second length updating unit and a returning unit, wherein:

the entry number determination unit is configured to determine whether the number of entries in the inverted index corresponding to the query string that is truncated by the query string truncation unit is greater than N;

the second length updating unit is configured to take the second length after being added by one as the updated second length; and the returning unit is configured to return a query string which number of entries is greater than N according to a determination result of the entry number determination unit and the second length that is updated by the second length updating unit to the query string truncation unit.

In an embodiment, the filtering unit comprises an identification conversion unit and a comparison filtering unit, wherein:

the identification conversion unit is configured to identify whether a query string and an entry are in a same language, and if not, convert a language of the query string or the entry so that the query string and the entry are in the same language; and the comparison filtering unit is configured to compare all entries corresponding to the truncated query string with the query string one character by one character starting from a first character, and filter unmatched entries.

The data processing method and system of the present disclosure create an input recommendation index, determine a number of entries to which a same prefix is pointed after establishing a corresponding relationship between prefixes and entries, increase a prefix length of a prefix if the number of entries associated with that same prefix is too large so as to further refine the prefix, and re-establish a relationship between the refined prefix and the entries. In this way, as the length of the prefix increases, a number of entries to which the prefix is pointed decreases, thus establishing an inverted index having a variable prefix length based on entry number distribution, preventing the established inverted index from generating a number of index entries that are rarely used, and reducing the redundancy of the input recommendation index that is created.

The method and the system of providing input recommendation based on the input recommendation index established in the present disclosure truncate a received query string according to a second length when a length of the query string is greater than or equal to the second length, temporarily increase a value of the second length for re-truncating the query string if a number of entries corresponding to the truncated query string is greater than N to ensure that the number of entries is less than or equal to N, and filter out entries that are unmatched with the query string using a comparison method if an original length of the query string is greater than the second length and a number of entries found is less than or equal to N to ensure that the entries correspond to the received query string. The foregoing method dynamically increases a prefix length, thus ensuring that a number of entries that are found does not exceed N. Thus, the amount of computation for comparison may be reduced when the comparison is needed to be performed, thereby improving the efficiency for providing input recommendation.

In addition, the method and the system of providing input recommendation based on a created input recommendation index may also solve the problem of mixed input of Chinese characters and phonetic alphabets by converting content of a query string and an entry to utf-8 Unicode before comparison.

BRIEF DESCRIPTION OF THE DRAWINGS

Figures that are used for description of exemplary embodiments or existing technology will be briefly described herein in order to make the embodiments of the present disclosure or technical solutions in the existing technology more clear. The drawings described hereinafter are merely some embodiments of the present disclosure. One of ordinary skill in the art may acquire other drawings according to these drawings without making any creative effort.

DETAILED DESCRIPTION

A clear and complete description of technical solutions of the embodiments of the present disclosure is made in combination with the accompanying drawings in the embodiments of the present disclosure so that one of ordinary skill in the art may understand the technical solutions of the present disclosure in a better manner. The embodiments as described herein are merely a part but not all of the embodiments of the present disclosure. Based on the embodiments in the present disclosure, all other embodiments obtained by one of ordinary skill in the art without making any creative effort are within the scope of protection of the present disclosure.

Figure 1:
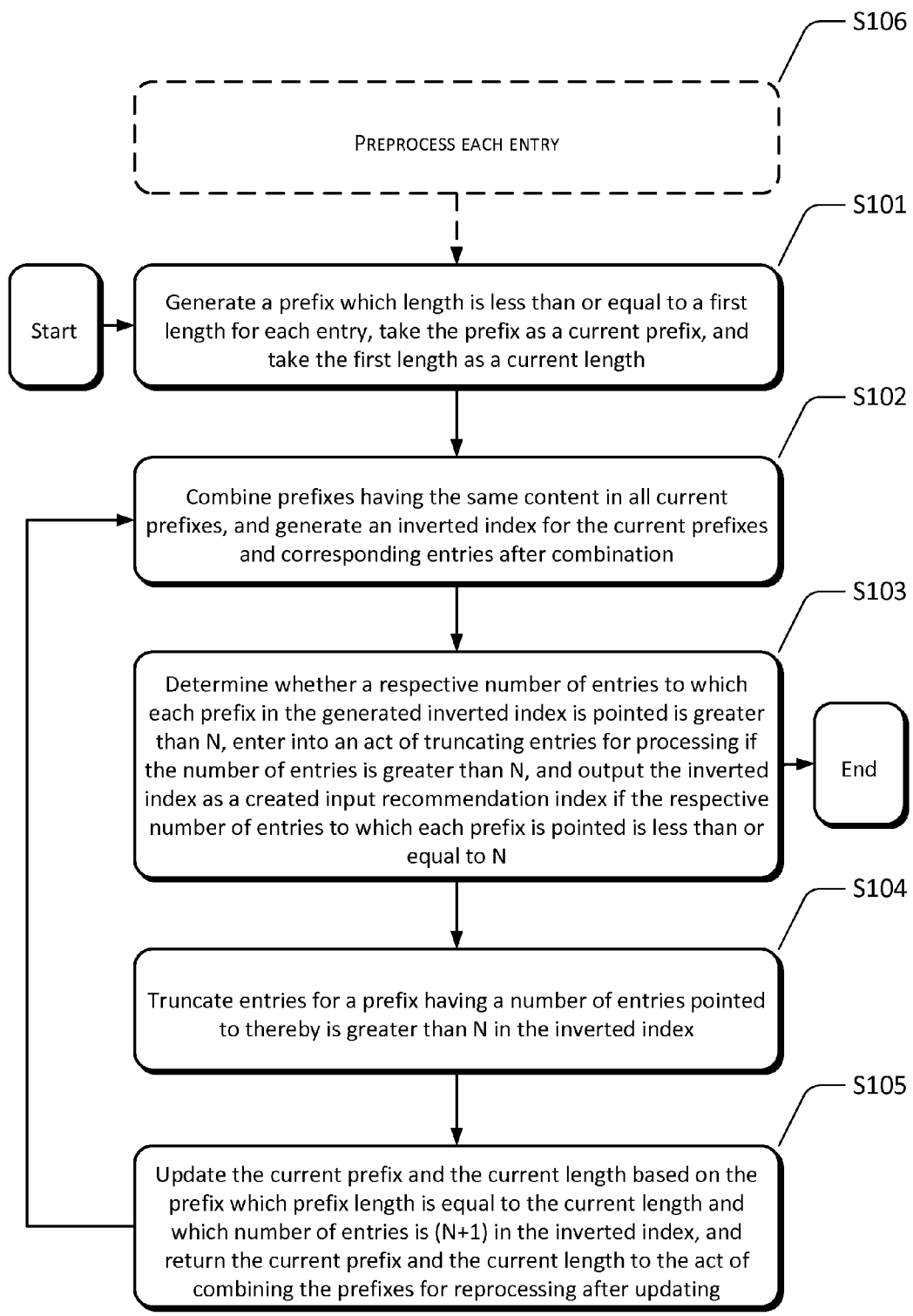
FIG. 1 is a flowchart of an example data processing method of establishing input recommendation index.

FIG. 1 is a flowchart of a data processing method of establishing input recommendation index in accordance with the present disclosure. As shown in FIG. 1, the data processing method of establishing input recommendation index in the present disclosure comprises:

S101 generates a prefix which length is less than or equal to a first length for each entry, takes the prefix as a current prefix, and takes the first length as a current length.

Firstly, a prefix having a length less than or equal to a first length is generated for each entry. utf-8 Unicode (8-bit Unicode Transformation Format or called Unicode) of a single Chinese character usually has a length of three bytes. For example, the utf-8 Unicode of a Chinese character "中" is "\xe4\xb8\xad". As such, a value of the first length is generally to be at least three. Typically, an English letter has a length of one byte. Therefore, when the value of the first length is three, a phonetic alphabet of each entry may only generate a prefix that includes three or fewer characters. A prefix having a length less than or equal to the first length is taken as a current prefix, and the first length is taken as a current length.

An entry "中国石化 (Sinopec)" is used as an example. Prefixes having a length less than or equal to three may comprise: a single Chinese character "中" and "Z", "ZH" and "ZHO" in a phonetic alphabet "zhongguoshihua".

S102 combines prefixes having the same content in all current prefixes, and generates an inverted index for the current prefixes and corresponding entries after combination.

The same prefix may exist for different entries. In order to ensure the uniqueness of a prefix in an inverted index that is generated, current prefixes having the same content are needed to be combined, and an inverted index is generated for the current prefixes after combination. The inverted index comprises prefixes and entries to which prefixes are pointed.

For example, for two entries "中国石化 (Sinopec)" and "中关村 (Zhongguancun)", when the current length is three, a relationship between a prefix of the entry "中国石化 (Sinopec)" and entries to which the prefix is pointed are as shown in Table 1, and a relationship between a prefix of the entry "中关村 (Zhongguancun)" and entries to which the prefix is pointed is as shown in Table 2.

TABLE 1

Relationship between a prefix of an entry "中国石化 (Sinopec)"
and entries to which the prefix is pointed.

| Prefixes | Entries to which prefixes are pointed |
|---|---|
| 中 | 中国石化 (Sinopec) |
| Z | 中国石化 (Sinopec) |
| ZH | 中国石化 (Sinopec) |
| ZHO | 中国石化 (Sinopec) |

TABLE 2

Relationship between a prefix of an entry "中关村 (Zhongguancun)"
and entries to which the prefix is pointed.

| Prefixes | Entries to which prefixes are pointed |
|---|---|
| 中 | 中关村 (Zhongguancun) |
| Z | 中关村 (Zhongguancun) |
| ZH | 中关村 (Zhongguancun) |
| ZHO | 中关村 (Zhongguancun) |

Prefixes in Table 1 and Table 2 that are equal are combined, and an inverted index is generated. Table 3 shows a relationship between the combined prefixes in the generated inverted index and entries to which the prefixes are pointed.

TABLE 3

Relationship between prefixes in an inverted index
that is generated after prefix combination and
respective entries to which the prefixes are pointed.

| Prefixes | Entries to which prefixes are pointed |
|---|---|
| 中 | 中国石化 (Sinopec), 中关村 (Zhongguancun) |
| Z | 中国石化 (Sinopec), 中关村 (Zhongguancun) |
| ZH | 中国石化 (Sinopec), 中关村 (Zhongguancun) |
| ZHO | 中国石化 (Sinopec), 中关村 (Zhongguancun) |

S103 determines whether a respective number of entries to which each prefix in the generated inverted index is pointed is greater than N, enters into an act of truncating entries for processing if the number of entries is greater than N, and outputs the inverted index as a created input recommendation index if the respective number of entries to which each prefix is pointed is less than or equal to N.

At S103, N is a preset value, and the value of N may be selected as needed, being at least five in general. If a number of entries corresponding to a prefix is greater than N, this indicates that too many suggestions corresponding to the prefix may be provided, and a portion of the entries may be not displayed. Thus, such prefixes and entries pointed thereby may need to go through further processing. If the respective number of entries corresponding to each prefix in the inverted index is less than or equal to N, this indicates that the entries corresponding to each prefix may serve as input recommendations without causing redundancy. In this case, the inverted index is the created input recommendation index.

For example, Table 4 shows a relationship between prefixes in a generated inverted index and entries pointed to by the prefixes. If the value of N is five, entries pointed to by prefixes "Z" and "ZH" are six respectively in Table 4. Thus, both the two prefixes and respective entries that are pointed to thereby are needed to undergo further processing. Number of entries that are pointed to by other prefixes is less than five, and thus no further processing is needed.

TABLE 4

Relationship between prefixes in an inverted index and entries pointed to by the prefixes.

| Prefixes | Entries pointed to by the prefixes |
|---|---|
| 中 | 中国石化 (Sinopec), 中关村 (Zhongguancun), 中国石油 (PetroChina), 中国人 (Chinese) |
| 站 | 站长 (station master) |
| 张 | 张扬 (publicize) |
| Z | 中国石化 (Sinopec), 中关村 (Zhongguancun), 中国石油 (PetroChina), 中国人 (Chinese), 站长 (station master) and 张扬 (publicize) |
| ZH | 中国石化 (Sinopec), 中关村 (Zhongguancun), 中国石油 (PetroChina), 中国人 (Chinese), 站长 (station master) and 张扬 (publicize) |
| ZHO | 中国石化 (Sinopec), 中关村 (Zhongguancun), 中国石油 (PetroChina), 中国人 (Chinese) |
| ZHA | 站长 (station master) and 张扬 (publicize) |

S104 truncates entries for a prefix having a number of entries pointed to thereby is greater than N in the inverted index.

Truncating the entries for the prefix having the number of entries pointed to thereby is greater than N at S104 comprises: truncating first N entries from entries pointed to by a prefix which prefix length is less than the current length, and truncating first (N+1) entries from entries pointed to by a prefix which prefix length is equal to the current length.

For example, Table 5 shows a relationship between prefixes in a generated inverted index and entries pointed to by the prefixes when the current length is three. A result is as shown in Table 6 after truncation based on the foregoing principle of truncation.

TABLE 5

Relationship between prefixes in a generated inverted index and entries pointed to by the prefixes when a current length is three.

| Prefixes | Entries pointed to by the prefixes |
|---|---|
| 中 | 中国石化 (Sinopec), 中国人 (Chinese), 中国 (China), 中关村 (Zhongguancun), 中国银行 (Bank of China), 中国联通 (China Unicorn), 中通快递 (ZTO EXPRESS) and 中国电信 (China Telecom) |
| Z | 中国石化 (Sinopec), 中国人 (Chinese), 中国 (China), 中关村 (Zhongguancun), 中国银行 (Bank of China), 中国联通 (China Unicorn), 中通快递 (ZTO EXPRESS) and 中国电信 (China Telecom) |
| ZH | 中国石化 (Sinopec), 中国人 (Chinese), 中国 (China), 中关村 (Zhongguancun), 中国银行 (Bank of China), 中国联通 (China Unicorn), 中通快递 (ZTO EXPRESS) and 中国电信 (China Telecom) |
| ZHO | 中国石化 (Sinopec), 中国人 (Chinese), 中国 (China), 中关村 (Zhongguancun), 中国银行 (Bank of China), 中国联通 (China Unicorn), 中通快递 (ZTO EXPRESS) and 中国电信 (China Telecom) |

TABLE 6

Relationship between prefixes and entries pointed to by the prefixes after truncation.

| Prefixes | Entries pointed to by the prefixes |
|---|---|
| 中 | 中国石化 (Sinopec), 中国人 (Chinese), 中国 (China), 中关村 (Zhongguancun), 中国银行 (Bank of China) and 中国联通 (China Unicorn) |
| Z | 中国石化 (Sinopec), 中国人 (Chinese), 中国 (China), 中关村 (Zhongguancun) and 中国银行 (Bank of China) |
| ZH | 中国石化 (Sinopec), 中国人 (Chinese), 中国 (China), 中关村 (Zhongguancun) and 中国银行 (Bank of China) |
| ZHO | 中国石化 (Sinopec), 中国人 (Chinese), 中国 (China), 中关村 (Zhongguancun), 中国银行 (Bank of China) and 中国联通 (China Unicorn) |

S105 updates the current prefix and the current length based on the prefix which prefix length is equal to the current length and which number of entries is (N+1) in the inverted index, and returns the current prefix and the current length to the act of combining the prefixes for reprocessing after updating.

For a prefix having a prefix length equal to the current length and a number of entries thereof equal to (N+1) in the inverted index, content of the prefix is increased by one byte according to entry content. A newly added byte may be either Chinese utf-8 Unicode of a next byte that is adjacent to the prefix content in each entry corresponding to a Chinese prefix or a next phonetic alphabet that is adjacent to a prefix in each entry corresponding to a phonetic prefix. The prefix that is added with the byte forms a new prefix. All prefixes comprising the new prefix are taken as updated current prefixes, and the current length that is increased by one is taken as an updated current length. The updated current prefixes and the updated current length are returned to the act of combining the prefixes for reprocessing.

For example, in prefixes and entries that are pointed thereby in Table 6, prefix lengths of prefixes "中" and "ZHO" are equal to three, and respective numbers of entries that are pointed by the two prefixes are greater than five. As such, content of the prefixes is increased by one byte according to the entries pointed by these two prefixes. A newly added byte may be either a next Chinese utf-8 Unicode that is adjacent to a prefix in each entry corresponding to the Chinese prefix, for example, Chinese utf-8 Unicode of a next byte that is adjacent to the prefix "中" in each entry corresponding to the Chinese prefix "中", which includes: the first byte in utf-8 Unicode of the Chinese character "国", "关" and "通"; the utf-8 Unicode of "国" is \xe5\x9b\xbd, the utf-8 Unicode of "关" is \xe5\x85\xb3, and the utf-8 Unicode of "通" is \xe9\x80\x9a. Therefore, the newly added byte may be "\xe5" or "\xe9". The newly added byte may also be a next phonetic alphabet that is adjacent to a prefix in each entry corresponding to a phonetic alphabet prefix, for example, a phonetic alphabet "N" that is adjacent to a phonetic alphabet prefix "ZHO". Therefore, for the prefixes in Table 6, new prefixes may comprise: "中\xe5", "中\xe9" and "ZHON". All prefixes comprising the new prefixes are taken as updated current prefixes, and the current length is increased by one and is taken as an updated current length. The current prefix and the current length that are updated are returned to the acts of S102-S105 for reprocessing until respective numbers of entries that are pointed by the current prefixes are less than or equal to N as described at S103. Table 7 shows a relationship between current prefixes in a generated inverted index and entries pointed by the prefixes after the current prefixes are updated.

TABLE 7

Relationship between current prefixes with an addition of new prefixes and entries that are pointed thereby.

| Prefixes | Entries pointed by the prefixes |
|---|---|
| 中 | 中国石化 (Sinopec), 中国人 (Chinese), 中国 (China), 中关村 (Zhongguancun), 中国银行 (Bank of China) and 中国联通 (China Unicorn) |
| 中\xe5 | 中国石化 (Sinopec), 中国人 (Chinese), 中国 (China), 中关村 (Zhongguancun), 中国银行 (Bank of China), 中国联通 (China Unicorn) and 中国电信 (China Telecom) |
| 中\xe9 | 中通快递 (ZTO EXPRESS) |
| Z | 中国石化 (Sinopec), 中国人 (Chinese), 中国 (China), |
| ZH | 中关村 (Zhongguancun) and 中国银行 (Bank of China) 中国石化 (Sinopec), 中国人 (Chinese), 中国 (China), |
| ZHO | 中关村 (Zhongguancun) and 中国银行 (Bank of China) 中国石化 (Sinopec), 中国人 (Chinese), 中国 (China), 中关村 (Zhongguancun), 中国银行 (Bank of China) and 中国联通 (China Unicorn) |
| ZHON | 中国石化 (Sinopec), 中国人 (Chinese), 中国 (China), 中关村 (Zhongguancun), 中国银行 (Bank of China), 中国联通 (China Unicorn), 中通快递 (ZTO EXPRESS) and 中国电信 (China Telecom) |

For the foregoing data processing method of establishing input recommendation index, the acts of S101~S105 thereof may be simply expressed using a code-style expression method:

L1: {set up a first length, the first length being taken as a current length;

L2: generate a prefix having a length less than or equal to the first length;

L3: {combine prefixes having same prefix content;

L4: generate an inverted index;

L5: determine a respective number of entries that are pointed by each prefix in the inverted index;

L6: {jump to L8 if the number of entries is greater than N;

L7: jump to L16 if the number of entries is less than or equal to N};

L8: determine whether a length of a prefix is less than the current length;

L9: {if the length of the prefix is less than the current length

L10: truncate first N entries;

L11: if the length of the prefix is equal to the current length

L12: truncate first (N+1) entries;}

L13: select prefixes which prefix length is equal to the current length and which number of entries is equal to (N+1) from the inverted index;

L14: For the prefixes selected at L13, prefix content is increased by one byte and the current length is increased by one;

L15: return to L3;}

L16: output the inverted index as a created input recommendation index;}

After establishing a corresponding relationship between prefixes and entries, the foregoing data processing method of establishing input recommendation index determines a number of entries pointed by a same prefix, increases a length of the prefix if the number of entries associated with the same prefix is too large so as to further refine the prefix, and then re-establish a relationship between the refined prefix and the entries. In this way, as the length of the prefix increases, the number of entries pointed by the prefix decreases, thus forming an inverted index having a variable prefix length based on entry number distribution, avoiding a created input recommendation index from producing a large number of index entries that are rarely used, and thus reducing redundancy of the created input recommendation index.

Figure 2:
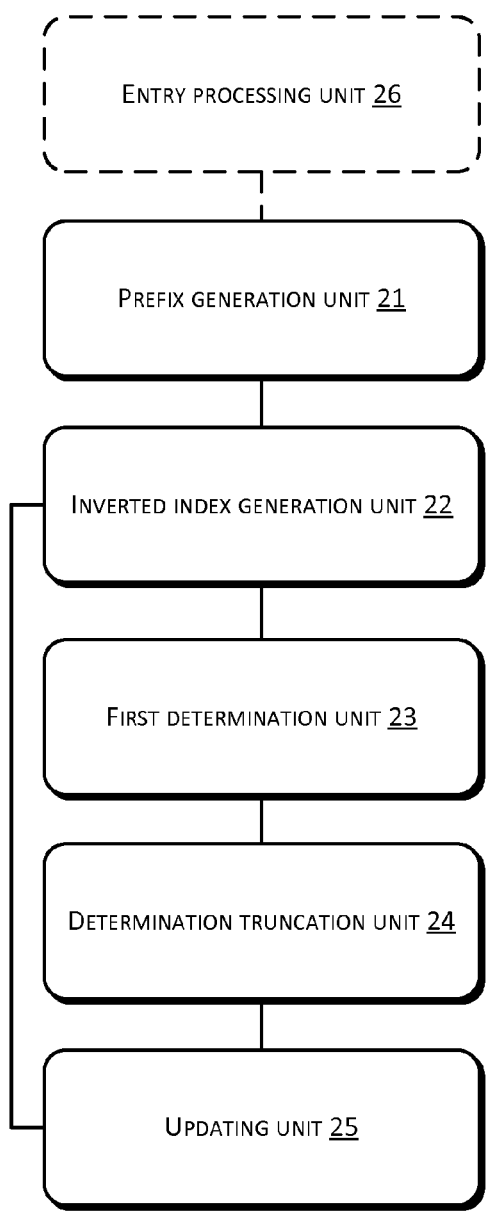
FIG. 2 is a structural diagram of an example data processing system of establishing input recommendation index.

FIG. 2 is a structural diagram of a data processing system of establishing input recommendation index in accordance with the present disclosure. As shown in FIG. 2, the data processing system of establishing input recommendation comprises: a prefix generation unit 21, an inverted index generation unit 22, a first determination unit 23, a determination truncation unit 24 and an updating unit 25.

The prefix generation unit 21 is configured to generate a prefix which length is less than or equal to a first length for each entry, take the prefix as a current prefix, and take the first length as a current length.

The inverted index generation unit 22 is configured to combine prefixes having same content in current prefixes and generate an inverted index for the combined prefixes and corresponding entries.

The first determination unit 23 is configured to determine whether a number of entries to which each prefix is pointed is greater than N in the inverted index that is generated by the inverted index generation unit 22, output the inverted index as an input recommendation index that is created if the number of entries to which each prefix is pointed is less than or equal to N, and shift to the determination truncation unit 24 for processing if the number of entries is greater than N.

The determination truncation unit 24 is configured to truncate entries if a number of entries to which a prefix is pointed is greater than N in the first determination unit 23.

The updating unit 25 is configured to update the current prefix and the current length according to a prefix which prefix length is equal to the current length and which number of entries is (N+1) in the inverted index, and return the current prefix and the current length that are updated to an act of the combining of the prefixes for reprocessing.

Figure 3:
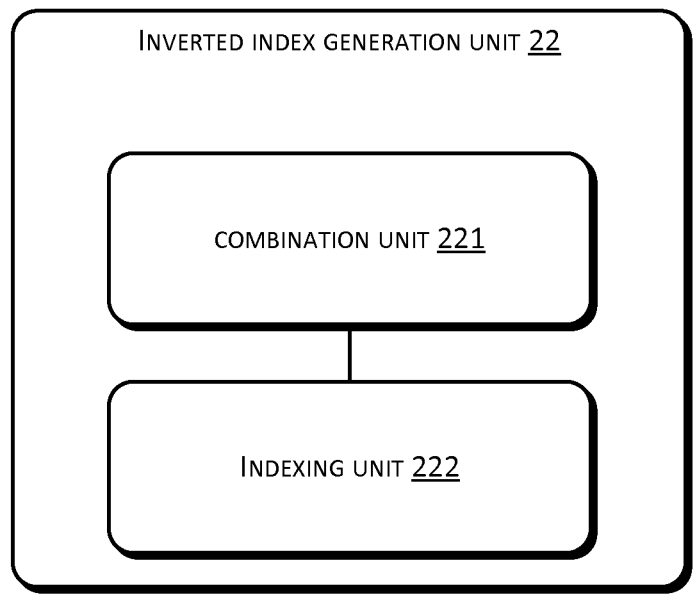
FIG. 3 is a structural diagram of an inverted index generation unit in the example data processing system.

FIG. 3 is a structural diagram of the inverted index generation unit 22. As shown in FIG. 3, the inverted index generation unit 22 comprises a combination unit 221 and an indexing unit 222.

The combination unit 221 is configured to combine the prefixes having the same content in all current prefixes.

The indexing unit 222 is configured to generate the inverted index for the combined prefixes and the corresponding entries.

Figure 4:
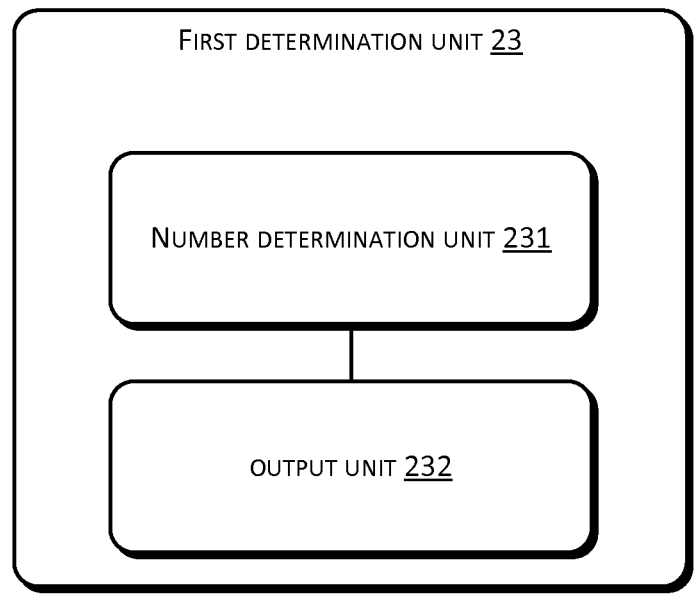
FIG. 4 is a structural diagram of a first determination unit in the example data processing system.

FIG. 4 is a structural diagram of the first determination unit 23. As shown in FIG. 4, the first determination unit 23 comprises a number determination unit 231 and an output unit 232.

The number determination unit 231 is configured to determine whether the number of entries pointed by each prefix in the current prefixes is greater than N in the inverted index that is generated by the inverted index generation unit 22.

The output unit 232 is configured to output the inverted index, and output an inverted index result in the inverted index generation unit 22 if the number of entries to which each prefix is pointed is less than or equal to N in a determination result of the number determination unit 231.

Figure 5:
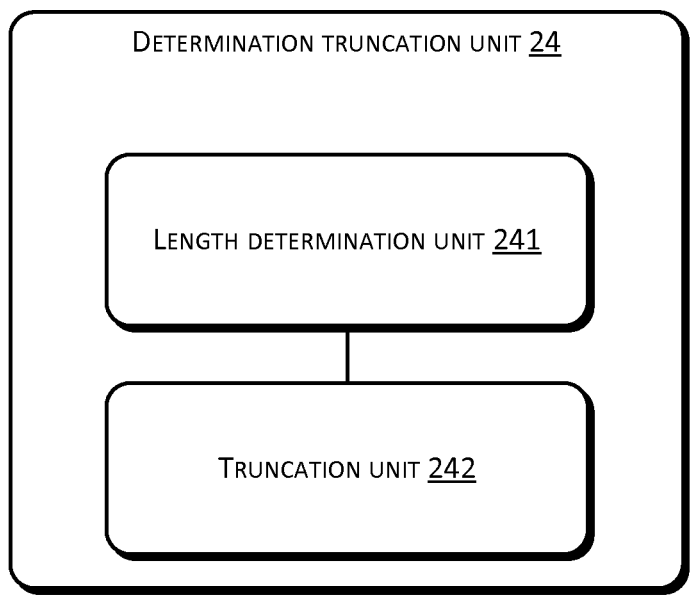
FIG. 5 is a structural diagram of a determination truncation unit in the example data processing system.

FIG. 5 is a structural diagram of the determination truncation unit 24. As shown in FIG. 5, the determination truncation unit 24 comprises a length determination unit 241 and a truncation unit 242.

The length determination unit 241 is configured to determine whether a length of each prefix is less than the current length.

The truncation unit 242 is configured to truncate first N entries from entries to which a prefix which prefix length is less than the current length is pointed according to a result of the length determination unit 241, and truncate first (N+1) entries from entries to which a prefix which prefix length is equal to the current length is pointed in the result of the length determination unit 241.

Figure 6:
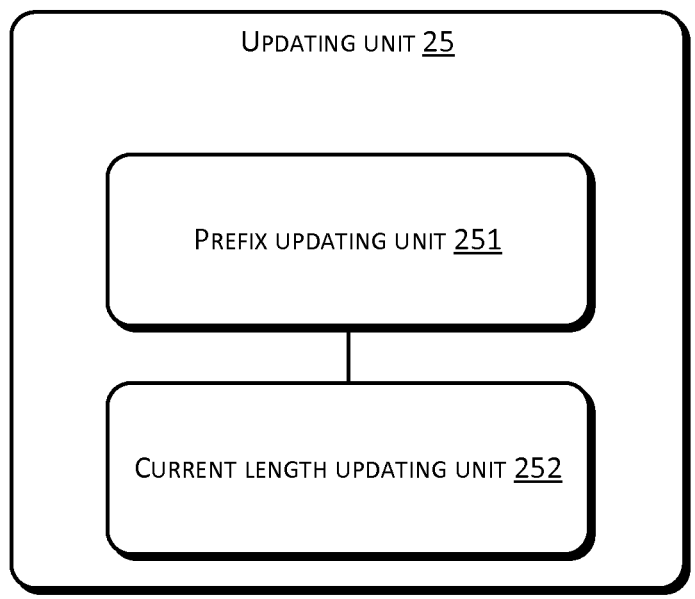
FIG. 6 is a structural diagram of an updating unit in the example data processing system.

FIG. 6 is a structural diagram of the updating unit 25. As shown in FIG. 6, the updating unit 25 comprises a prefix updating unit 251 and a current length updating unit 252.

The prefix updating unit 251 is configured to add one byte to the prefix which prefix length is equal to the current length and which number of entries is equal to (N+1) according to entry content to form a new prefix, and update all prefixes with the added prefix as the current prefixes.

The current length updating unit 252 is configured to take the current length that is increased by one as an updated current length.

The foregoing data processing system of establishing input recommendation index corresponds to the data processing method of establishing input recommendation index, and may implement each act in the data processing method. An input recommendation index created by the data processing system may achieve an implementation effect of the data processing method.

A second embodiment of the data processing method of establishing input recommendation index in the present disclosure is introduced hereinafter. As shown in FIG. 1, a difference between this second embodiment and the first embodiment of the data processing method is that the data processing method of establishing input recommendation index further comprises preprocessing each entry S106, which may include: removing meaningless characters such as a space, a punctuation and the like, from entries, and unifying uppercase and lowercase letters as well as simplified Chinese characters and traditional Chinese characters, for example, unifying uppercase and lowercase letters as uppercase letters, or unifying simplified Chinese characters and traditional Chinese characters as simplified Chinese characters. For example, an entry " 石_油 " may be converted into " 石油(petroleum)", or an entry "中國石化" may be converted into "中国石 化 (Sinopec)", etc. Other parts of the embodiment are the same as those of the first embodiment of the data processing method, and are not described in detail herein.

A second embodiment of the data processing system of establishing an input recommendation index in the present disclosure is introduced hereinafter. As shown in FIG. 2, in correspondence with the second embodiment of the data processing method of establishing an input recommendation index, a difference between the second embodiment and the first embodiment of the data processing system of establishing input recommendation index is that this data processing system of establishing an input recommendation index further comprises an entry preprocessing unit 26. The entry preprocessing unit 26 is configured to preprocess each entry, which includes: removing meaningless characters such as a space, a punctuation and the like, from entries, and unifying uppercase and lowercase letters as well as simplified Chinese characters and traditional Chinese characters, for example, unifying uppercase and lowercase letters as uppercase letters, or unifying simplified Chinese characters and traditional Chinese characters as simplified Chinese characters. Other parts of this embodiment are the same as those of the first embodiment of the data processing system, and are not described in detail herein.

In the foregoing second embodiment of the data processing method of establishing an input recommendation index, the act of preprocessing entries is added on the basis of the first embodiment of the data processing method of establishing an input recommendation index, thus eliminating meaningless characters from an input recommendation index that is created and unifying uppercase and lowercase letters as well as simplified Chinese character and traditional Chinese characters, and providing more accurate data for the data processing method of establishing the input recommendation index.

Correspondingly, in the second embodiment of the data processing system of establishing an input recommendation index, an entry preprocessing unit is added on the basis of the first embodiment of the data processing method of establishing an input recommendation index, thus implementing the process of data processing in the second embodiment of the data processing method, and providing more accurate data for the data processing method of establishing the input recommendation index.

Figure 7:
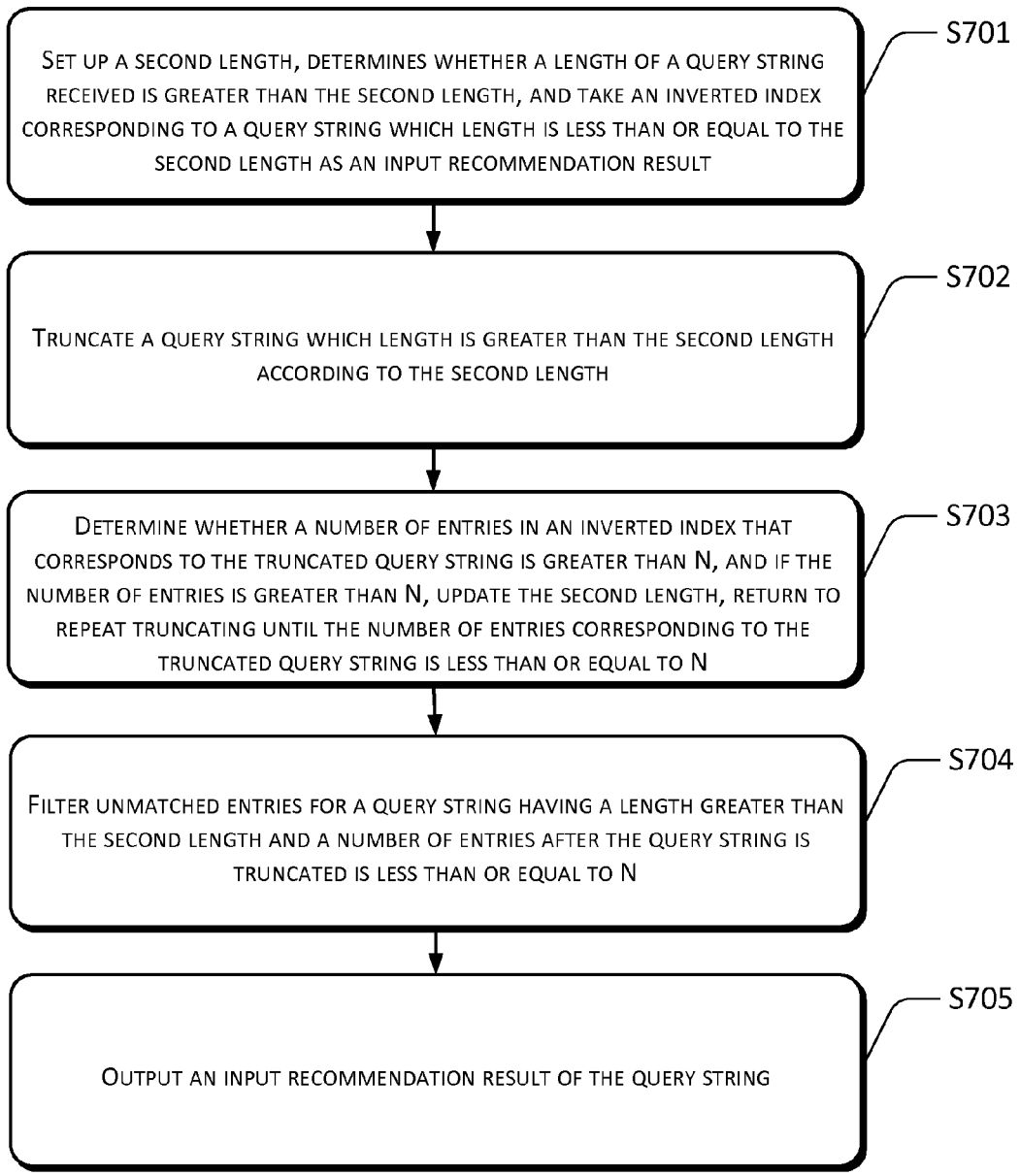
FIG. 7 is a flowchart of an example method of providing input recommendation based on an input recommendation index that is created.

FIG. 7 is a flowchart of a method of providing input recommendation based on a created input recommendation index according to an embodiment of the present disclosure. As shown in FIG. 7, the method of providing input recommendation based on a created input recommendation index comprises:

S701 sets up a second length, determines whether a length of a query string received is greater than the second length, and takes an inverted index corresponding to a query string which length is less than or equal to the second length as an input recommendation result.

The first length in the method of establishing input recommendation index is taken as the second length in this method. An inverted index corresponding to a received query string is taken as an input recommendation result when a length of the query string is less than or equal to the second length. If the length of the received query string is greater than the second length, a next method block is entered for processing.

S702 truncates a query string which length is greater than the second length according to the second length.

Truncating a query string having a length is greater than the second length according to the second length for the query string particularly comprises truncating content of the query string that is positioned prior to the second length.

S703 determines whether a number of entries in an inverted index that corresponds to the truncated query string is greater than N, and if the number of entries is greater than N, updates the second length, returns to repeat truncating until the number of entries corresponding to the truncated query string is less than or equal to N.

For the query string that is truncated at S702, corresponding entries is found according to the inverted index, and a determination is made as to whether a number of entries is greater than N. Since in the process of creating the inverted index, a number of entries truncated for a prefix that needs a further addition of a prefix byte is N+1, when the number of entries greater than N, this signifies that a length of the prefix may be further increased, and the second length is increased by one and is taken as an updated second length. The query string which number of entries is greater than N and the second length are then returned to S702. The query string undergoes re-truncation according to the updated second length, truncating the content of the query string positioned before the second length. Entries corresponding to the re-truncated query string are found according to the inverted index, and a determination is made as to whether a number of entries that are found is greater than N, until the number of entries found is smaller than or equal to N.

S704 filters unmatched entries for a query string having a length greater than the second length and a number of entries after the query string is truncated is less than or equal to N.

For a query string which length is greater than the second length and which number of entries after the query string is truncated is smaller than or equal to N, as entries corresponding to the query string are found by means of truncation, this may cause a subset of entries failing to correspond to a complete content of the received query string. As such, a comparison between entries in the inverted index and the complete content of the query string is needed to filter unmatched entries. Specifically, the content of the query string is compared with content of each entry one by one starting from the first character. If a length of the query string is x and the first x bytes in an entry are identical to the content of the query string, the entry is considered to be an entry corresponding to the query string. If not identical, the entry is considered to be an entry not corresponding to the query string, and is filtered out at this method block.

For example, the first length is set as three and the value of N is set as six at the time of establishing the input recommendation index. Five entries corresponding to a prefix "abc" are "abcd, abce, abcf, abcp and abcea". Therefore, no re-creation of the index by adding bytes is needed for the prefix "abc", and the created index contains a corresponding relationship of "abc"→"abcd, abce, abcf, abcp and abcea". When a query string "abce" is received, the second length is initially set as three and the value of N is set as six, the first three bytes "abc" in the query string "abce" is thus truncated for performing a search to obtain corresponding entries "abcd, abce, abcf, abcp and abcea", which satisfies the number of entries being less than six. However, only two entries "abce and abcea" correspond to the query string "abce", while the other three entries "abcd, abcf and abcp" do not correspond to the query string "abce". Thus, "abcd, abcf, abcp" are needed to be filtered out at this method block.

It should be noted that during the process of comparison, if characters of a query string and an entry are not in a same language, for example, the characters of the query string are Chinese but the characters of the entry are letters, content of the query string and the entry may be converted into phonetic alphabets before making a comparison.

S705 outputs an input recommendation result of the query string.

For a query string which length is less than the second length at S701, corresponding entries are directly outputted as an input recommendation result of the query string. For no same index that is found after truncation at S703, a null value is returned as the input recommendation result of the query string. For an index that is found after truncating a query string at S703, a filtering result at S704 is outputted as the input recommendation result of the query string after filtering at S704.

The foregoing method of providing input recommendation based on an established input recommendation index truncates a received query string according to a second length when a length of the query string is greater than or equal to the second length, temporarily increases a value of the second length for re-truncating the query string if a number of entries corresponding to the truncated query string is greater than N to ensure that the number of entries is less than or equal to N, and filters out entries that are unmatched with the query string using a comparison method if an original length of the query string is greater than the second length and a number of entries found is less than or equal to N to ensure that the entries correspond to the received query string. The foregoing method dynamically increases a prefix length, thus ensuring that a number of entries that are found does not exceed N. Thus, the amount of computation for comparison may be reduced when the comparison is needed to be performed, thereby improving the efficiency for providing input recommendation.

In addition, the method may also solve the problem of mixed input of Chinese characters and Chinese phonetic alphabets if converting content of a query string and an entry into utf-8 Unicode before making a comparison.

Figure 8:
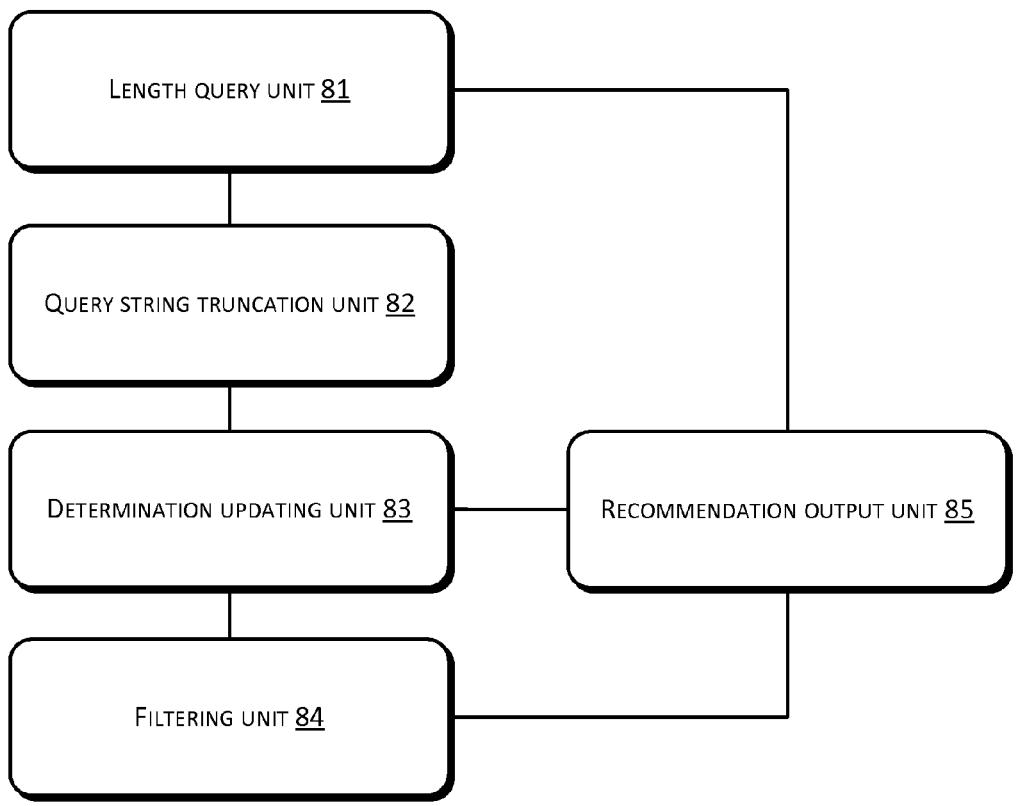
FIG. 8 is a structural diagram of an example system of providing input recommendation based on an input recommendation index that is created.

FIG. 8 is a structural diagram of a system of providing input recommendation based on an input recommendation index established according to an embodiment of the present disclosure. As shown in FIG. 8, the system of providing input recommendation based on an input recommendation index established comprises: a length query unit 81, a query string truncation unit 82, a determination updating unit 83, a filtering unit 84 and a recommendation output unit 85.

The length query unit 81 is configured to set up a second length, determine whether a length of a query string received is greater than the second length, and take an inverted index corresponding to a query string which length is less than or equal to the second length as an input recommendation result.

The query string truncation unit 82 is configured to truncate a query string which length is greater than the second length according to the second length.

The determination updating unit 83 is configured to determine whether a number of entries in an inverted index corresponding to the truncated query string is greater than N, updating the second length if the number of entries is greater than N, and returning to the query string truncation unit 82 for repeating the truncating until the number of entries corresponding to the truncated query string is less than or equal to N.

The filtering unit 84 is configured to filter unmatched entries if the length of the query string is greater than the second length and the number of entries corresponding to the query string truncated is less than or equal to N.

The recommendation output unit 85 is configured to output the input recommendation result of the query string.

Figure 9:
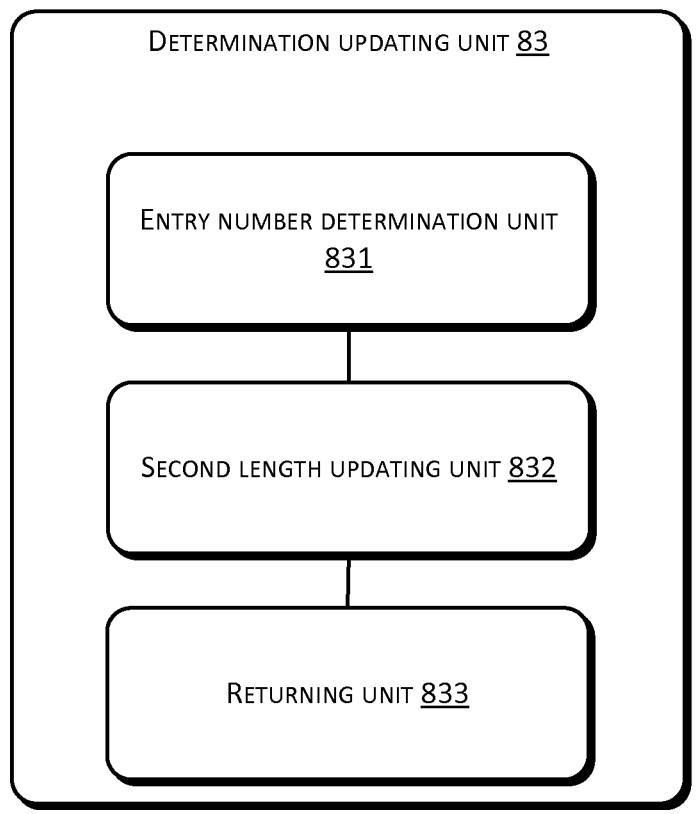
FIG. 9 is a structural diagram of a determination updating unit of the example system of providing input recommendation.

FIG. 9 is a structural diagram of the determination updating unit. As shown in FIG. 9, the determination updating unit 83 comprises an entry number determination unit 831, a second length updating unit 832 and a returning unit 833.

The entry number determination unit 831 is configured to determine whether the number of entries in the inverted index corresponding to the query string truncated by the query string truncation unit 82 is greater than N.

The second length updating unit 832 is configured to take the second length that is added by one as the updated second length.

The returning unit 833 is configured to return a query string which number of entries is greater than N according to a determination of the entry number determination unit 831 and the second length that is updated by the second length updating unit 832 to the query string truncation unit 82.

Figure 10:
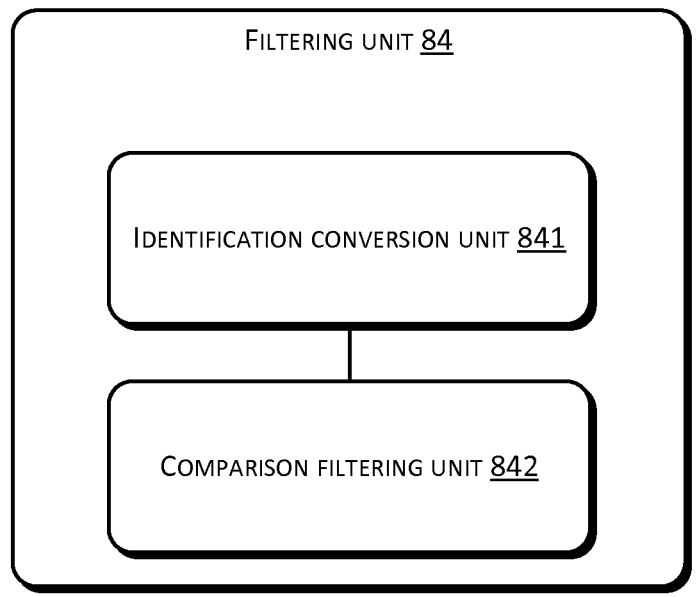
FIG. 10 is a structural diagram of a filtering unit of the example system of providing input recommendation.

FIG. 10 is a structural diagram of the filtering unit. As shown in FIG. 10, the filtering unit 84 comprises an identification conversion unit 841 and a comparison filtering unit 842.

The identification conversion unit 841 is configured to identify if a query string and an entry are in a same language, and if not, convert a language of the query string or the entry so that the query string and the entry are in the same language. Specifically, the query string and the entry may be converted into Chinese phonetic alphabets.

The comparison filtering unit 842 is configured to compare all entries in the inverted index that correspond to the truncated query string with the query string one by one starting from the first character, and filter unmatched entries.

The system of providing input recommendation based on an input recommendation index established corresponds to the method of providing input recommendation based on the input recommendation index established, and may implement the process of the example method to achieve the technical effects of the example method.

In the 1990s, a technological improvement may be differentiated between a hardware improvement (for example, improvement in circuit structures such as a diode, a transistor, a switch, etc.) and a software improvement (improvement in a method/process). However, along with the development in technologies, improvement in current methods or procedures may be regarded as a direct improvement of hardware circuit structures. Corresponding hardware circuit structures may be acquired by programming improved methods or procedures into hardware circuits. Therefore, one cannot say that improvement in methods and procedures cannot be achieved by hardware modules. For example, a programmable logic device (PLD), such as field programmable gate array (FPGA), is such an integrated circuit, which logic function may be determined by user via device programming. A digital system may be integrated onto a PLD via programming by designers, who do not need to ask chip manufacturers to design and manufacture an application-specific integrated circuit chip 2. Furthermore, manual manufacture of integrated circuit chips may mostly be replaced by using logic compiler software, which is similar to a software compiler used for program development and compilation. Original codes may also be written in a specific programming language before compiling, which is referred to as a hardware description language (HDL). HDL does not have one type only, but includes many types such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language) and the like, with the most commonly used nowadays being VHDL (Very-High-Speed Integrated Circuit Hardware Description Language) and Verilog2. One skilled in the art should understand that hardware circuits for implementing the logic method and procedure may be easily acquired by logically programming the method and procedure into an integrated circuit using the foregoing hardware description languages. A controller may be realized in any appropriate manner. For example, a controller may use a microprocessor or a processor, and computer readable media for storing computer readable programming codes (such as software or firmware) that are executable by the (micro) processor, a logic gate, a switch, an application specific integrated circuit (ASIC), a programmable logic controller (PLC) or an embedded microcontroller. Examples of a controller include, but are not limited to, the following microcontrollers: ARC 625D, Atmel AT91SAM, Microchip PIC18F26K20 and Silicone Labs C8051F320. A memory controller may also be realized as a part of a control logic of a memory device.

Other than realizing the controller by means of pure computer readable programming codes, logic programming may be performed for method blocks to realize the same function of the controller in a form such as a logic gate, a switch, an application specific integrated circuit, a programmable logic controller, and an embedded microcontroller, etc. Therefore, this type of controller may be regarded as a hardware component, and devices included therein for realizing various functions may also be regarded as an internal structure of the hardware component. Even more, devices for realizing various functions may be regarded as software modules for realizing the methods and the internal structure of the hardware component.

Systems, devices, modules or units illustrated in the above embodiments concretely may be implemented by a computer chip or entity, or may be implemented using a product with certain functions.

For the ease of description, the above devices are divided into different units based on functions for description individually. In the implementation of the present disclosure, functions of various units may be implemented in one or more pieces of software and/or hardware.

From the foregoing implementations, one skilled in the art may clearly know that the present disclosure can be implemented in terms of software and necessary general hardware platform. Based on this understanding, the technical solutions of the present disclosure in essence or the part of contribution to the existing technologies may be embodied in a form of a software product. In a typical configuration, a computing device includes one or more processors (CPU), input/output interfaces, a network interface and memory. The computer software product may include multiple instructions to direct a computing device (which may be a personal computer, a server or a network device, etc.) to perform the embodiments of the present disclosure or the methods described in certain parts of the embodiments. The computer software product may be stored in memory.

Figure 11:
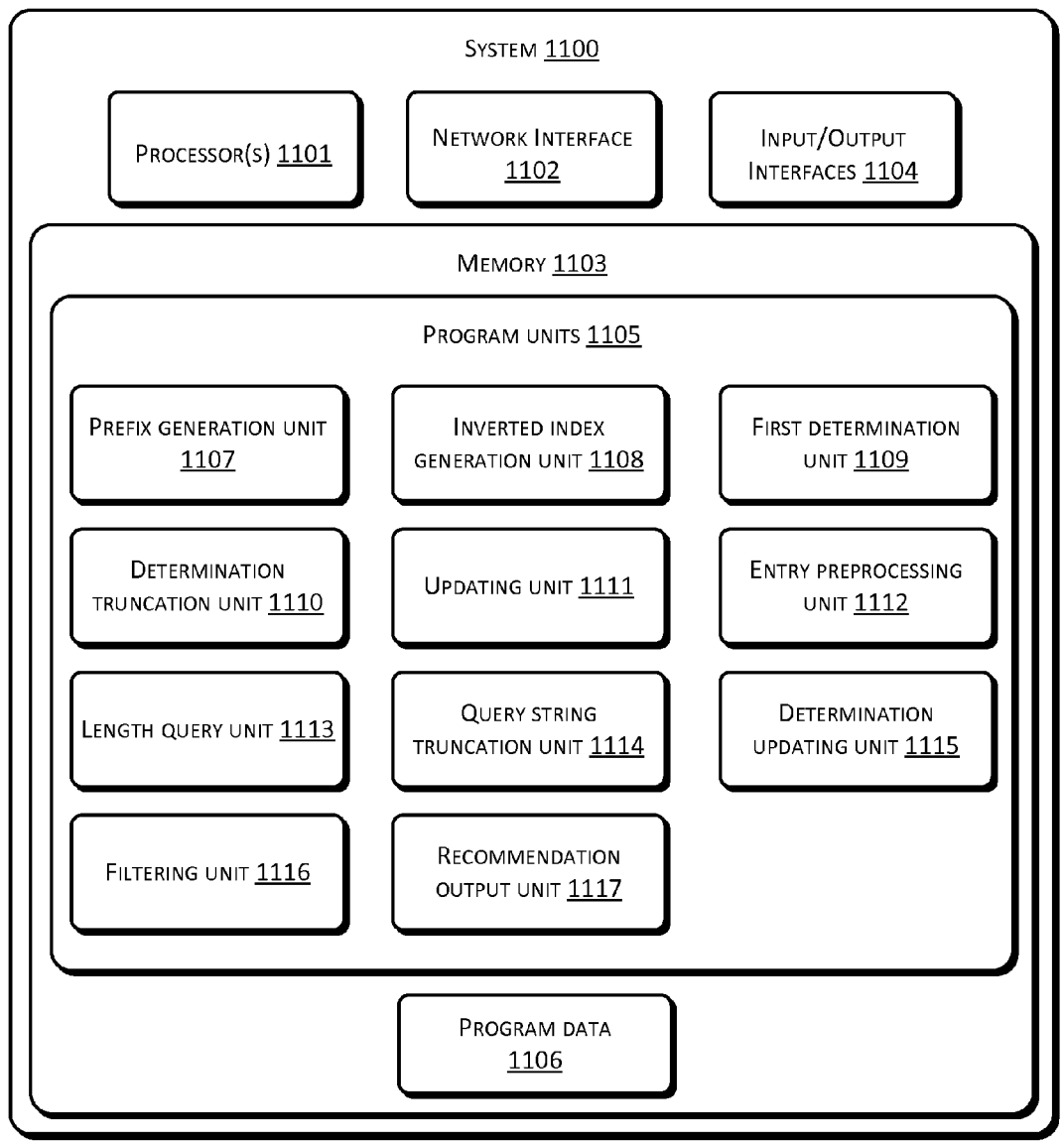
FIG. 11 is a structural diagram of the example system as described in FIGS. 2 and 8.

For example, FIG. 11 shows an example system 1100, such as the system as described above, in more detail. In an embodiment, the system 1100 may include, but is not limited to, one or more processors 1101, a network interface 1102, memory 1103 and an input/output interface 1104.

The memory 1103 may include a form of computer readable media such as a volatile memory, a random access memory (RAM) and/or a non-volatile memory, for example, a read-only memory (ROM) or a flash RAM. The memory 1103 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 1103 may include program units 1105 and program data 1106. In an embodiment, the program units 1105 may include a prefix generation unit 1107, an inverted index generation unit 1108, a first determination unit 1109, a determination truncation unit 1110, an updating unit 1111, an entry preprocessing unit 1112, a length query unit 1113, a query string truncation unit 1114, a determination updating unit 1115, a filtering unit 1116 and/or a recommendation output unit 1117. Details of these units may be found in the foregoing description and are therefore not redundantly described herein.

The embodiments of the present disclosure are described in a progressive manner. Portions emphasized in each embodiment are different from those of the other embodiments. The same or similar parts in different embodiments can be referenced with one another. Particularly, the description of the system embodiments is relatively simple because of their resemblance to the method embodiments, and related portions can be referenced to respective descriptions of the method embodiments. The present disclosure is applicable in various universal or application-specific computer system environment or configuration, for example, a personal computer, a server computer, a handheld device or portable device, a tablet device, a multiprocessor system, a microprocessor-based system, a set-top box, programmable consumer electronic equipment, a network PC, a small computer, a large computer, a distributed computing environment including any of the foregoing systems or devices, etc.

The present disclosure may be described in the context of computer executable instructions, for example, program modules, that are executable by a computer. Generally, a program module comprises a routine, a procedure, an object, a component, a data structure, etc., that executes a specific task or implements a specific abstract data type. The present disclosure may also be put into practice in a distributed computing environment. In such distributed computing environment, a task is performed by a remote processing apparatus that is connected via a communications network. In a distributed computing environment, program modules may be positioned in local and remote computer storage media including storage devices.

Although the present disclosure is described using the embodiments, one of ordinary skill in the art shall know that the present disclosure has a number of modifications and variations without departing from the spirit of the present disclosure, and it is intended that appended claims comprise these modifications and variations without departing from the spirit of the present disclosure.

The invention claimed is:

1. A method implemented by one or more computing devices, the method comprising:
    generating a prefix which length is less than or equal to a first length for each entry, taking the prefix as a current prefix and the first length as a current length;
    combining prefixes having a same content in a plurality of current prefixes and generating an inverted index for the combined prefixes and corresponding entries;
    determining whether a respective number of entries pointed by each prefix in the inverted index is greater than a preset value N:
        if a prefix that points to more than N number of entries exists in the inverted index, truncating entries for the prefix which number of entries is greater than N in the inverted index,
        updating the current prefix and the current length based on a prefix which prefix length is equal to the current length and which number of entries is (N+1) in the inverted index, and
        returning the current prefix and the current length that have been updated to the step of combining the prefixes for reprocessing again; and
    outputting the inverted index as an input recommendation index if the respective number of entries pointed by each prefix is less than or equal to N.

2. The method as recited in claim 1, wherein truncating the entries for the prefix which number of entries is greater than N in the inverted index includes: for the prefix which number of entries is greater than N in the inverted index, truncating first N entries that are pointed by the prefix if a length of the prefix is less than the current length, and truncating first (N+1) entries that are pointed by the prefix if the length of the prefix is equal to the current length.

3. The method as recited in claim 1, wherein updating the current prefix and the current length based on the prefix which prefix length is equal to the current length and which number of entries is (N+1) in the inverted index includes: adding one byte to the prefix which prefix length is equal to the current length and which number of entries is (N+1) according to entry content to form a new prefix, taking all prefixes with the new prefix as updated current prefixes, and taking the current length that is increased by one as an updated current length.

4. The method as recited in claim 1, wherein a minimum value of the first length is three.

5. The method as recited in claim 1, wherein a minimum value of N is five.

6. The method as recited in claim 1, prior to generating the prefix which length is less than or equal to the first length for each entry, the method further includes: preprocessing the entries, preprocessing the entries comprising at least one of:
    eliminating a meaningless character from the entries, the meaningless character comprising a space and/or a punctuation; and
    unifying uppercase and lowercase letters, and simplified and traditional Chinese characters in entry content.

7. A system comprising:
    one or more processors;
    one or more memories stored thereon computer-readable instructions that, when executed by the one or more processors, cause the one or more processors to perform acts including:
        generating a prefix which length is less than or equal to a first length for each entry, and take the prefix as a current prefix and the first length as a current length;
        combining prefixes having a same content in current prefixes and generate an inverted index for the combined prefixes and corresponding entries;
        determining whether a number of entries that are pointed by each prefix in the generated inverted index is greater than N, shift to a truncating for processing if the number of entries is greater than N, and output the inverted index as an input recommendation index that is created if the number of entries that are pointed by each prefix is less than or equal to N;
        truncating entries for a prefix which number of entries is greater than N in the inverted index; and
        updating the current prefix and the current length based on a prefix which prefix length is equal to the current length and which number of entries is (N+1) in the inverted index, and return the current prefix and the current length that are updated to the act of combining prefixes for reprocessing again.

8. The system as recited in claim 7, wherein the acts further include:
determining whether a length of each prefix in the current prefixes is less than the current length; and
truncating first N entries from entries that are pointed by a prefix which prefix length is less than the current length, and truncate first (N+1) entries from entries that are pointed by a prefix which prefix length is equal to the current length.

9. The system as recited in claim 7, wherein the acts further include:
adding one byte to the prefix which prefix length is equal to the current length according to entry content to form a new prefix, and update all prefixes with the new prefix as the current prefixes; and
increasing the current length by one as an updated current length.

10. The system as recited in claim 7, wherein the acts further include:
combining the prefixes having the same content in all current prefixes; and
generating the inverted index for the combined prefixes and the entries corresponding to the prefixes.

11. The system as recited in claim 7, wherein the acts further include:
determining whether the number of entries that are pointed by each prefix in the current prefixes is greater than N in the inverted index; and
outputting the inverted index, and output an inverted index result if the number of entries that are pointed by each prefix is less than or equal to N based on a determination result of whether the number of entries that are pointed by each prefix in the current prefixes is greater than N in the inverted index.

12. The system as recited in claim 7, wherein the acts further include further preprocessing each entry.

13. One or more computer-readable media storing executable instructions that, when executed by one or more processors, cause the one or more processors to perform acts comprising:
setting up a first length, determining whether a length of a received query string is greater than the first length, and taking an inverted index corresponding to a query string which length is less than or equal to the first length as an input recommendation result;
truncating a query string which length is greater than the first length based on the first length;
determining whether a number of entries in the inverted index corresponding to the truncated query string is greater than N, updating the first length if the number of entries is greater than N;
returning the updated first length for repeating the truncating until the number of entries corresponding to the truncated query string is less than or equal to N;
filtering unmatched entries if the length of the query string is greater than the first length and the number of entries corresponding to the query string truncated is less than or equal to N; and
outputting the input recommendation result of the query string.

14. The one or more computer-readable media as recited in claim 13, wherein updating the first length includes taking the first length that is increased by one as the updated first length.

15. The one or more computer-readable media as recited in claim 13, wherein filtering the unmatched entries includes: comparing all entries corresponding to the truncated query string with the query string one character by one character starting from a first character, and filtering out an entry which first x characters are not identical to the query string, x representing the length of the query string.

16. The one or more computer-readable media as recited in claim 15, wherein comparing all entries in the inverted index that are found based on the truncated query string with the query string one character by one character comprises: converting the query string and the entries into phonetic alphabets for comparison when characters of the query string and the entries are not in a same language during a comparison process.

17. The one or more computer-readable media as recited in claim 13, wherein outputting the input recommendation result of the query string includes: directly outputting corresponding entries as the input recommendation result of the query string for the query string which length is less than the first length; returning a null value as the input recommendation result of the query string when no same index is found after the truncating; and taking a result after filtering the unmatched entries as the input recommendation result of the query string for the index that is found after the truncating.

18. The one or more computer-readable media as recited in claim 13, wherein a minimum of the first length is three.

19. The one or more computer-readable media as recited in claim 13, the acts further comprising generating the inverted index.

20. The one or more computer-readable media as recited in claim 13, wherein the inverted index includes a variable prefix length based on a distribution of number of entries.

* * * * *